United States Patent [19]

Holland et al.

[11] Patent Number: 5,169,894
[45] Date of Patent: Dec. 8, 1992

[54] LOWERING OF ANIONIC LOADING OF DISPERSANTS ON PIGMENT SLURRIES BY BLENDING WITH NONIONIC POLYMERS

[76] Inventors: Richard J. Holland, 21647 Canterbury St., Grosse Ile, Mich. 48138; Michael J. Anchor, 14056 Riverside Dr., Livonia, Mich. 48154; Christopher G. Utz, 2722 21st, Wyandotte, Mich. 48192

[21] Appl. No.: 614,322

[22] Filed: Nov. 16, 1990

[51] Int. Cl.⁵ .................... C08J 3/00; C08K 5/06; C08L 53/00
[52] U.S. Cl. .................... 524/502; 524/376; 524/377; 524/386; 524/447; 524/505
[58] Field of Search ............... 524/502, 505, 386, 376, 524/377, 447

[56] References Cited

U.S. PATENT DOCUMENTS 4,089,699  5/1978  Blackburn et al. .............. 524/505

Primary Examiner—Paul R. Michl
Assistant Examiner—Patrick Niland
Attorney, Agent, or Firm—Joyce L. Morrison

[57] ABSTRACT

Hydroxy terminated polyoxyethylene homopolymers or hydroxy terminated polyoxyethylene/polyoxypropylene block copolymers mixed with polycarboxylates have been found to be effective dispersants for aqueous, high solids, pigment slurries. The blend provides a simple, efficient means of matching the requirements of a particular slurry, while lowering the anionic loading on a pigment particle.

11 Claims, 6 Drawing Sheets

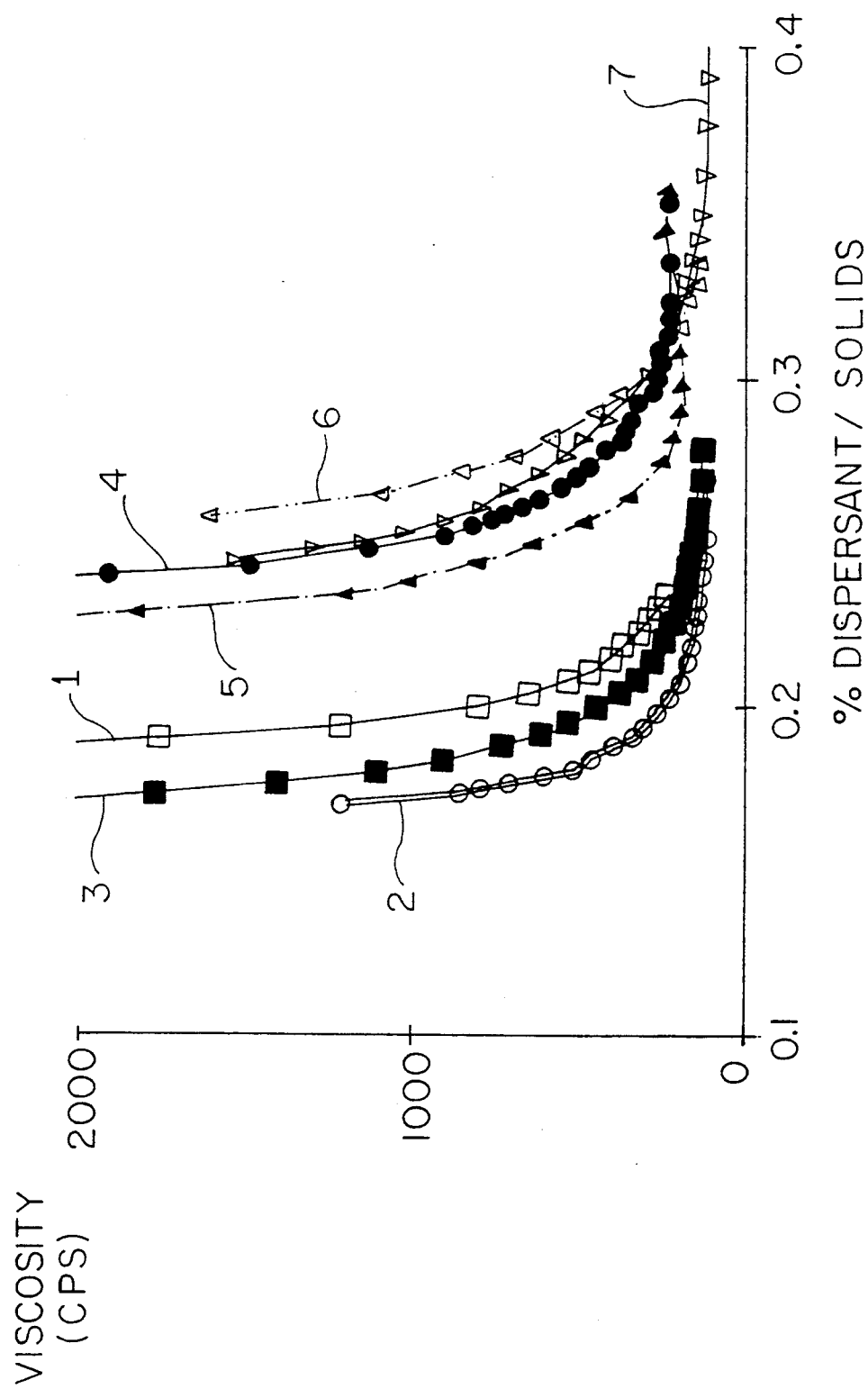

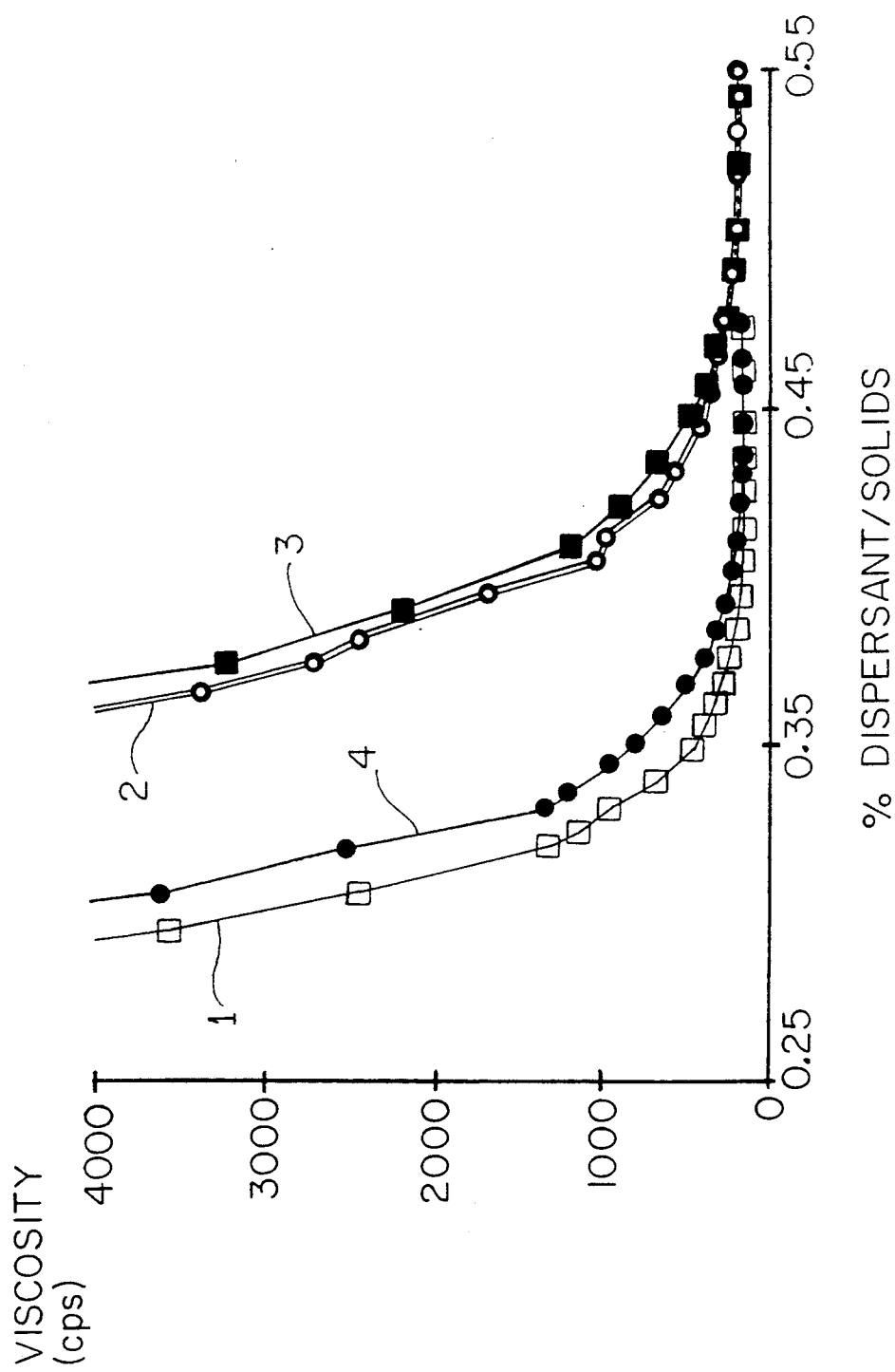

LOWERING OF ANIONIC LOADING OF DISPERSANTS ON PIGMENT SLURRIES BY BLENDING WITH NONIONIC POLYMERS

FIELD OF THE INVENTION

The present invention relates to novel dispersant compositions and a process for dispersing aqueous, high solids, inorganic pigment slurries, while effectively lowering the anionic loading of the pigment particles in said slurries More specifically the novel dispersant is a mixture of an acrylic homo- or copolymer, or a maleic copolymer hereinafter referred to as a polycarboxylate and hydroxy terminated polyoxyethylene homopolymers or hydroxy terminated polyoxyethylene/polyoxypropylene block copolymers. The process is accomplished by dispersing a pigment in water to form a slurry with the aid of the dispersant.

BACKGROUND ART

The use of the homopolymers of polyacrylic acid salts, modified copolymers of said salts, or the use of a combination of the two as dispersants for aqueous slurries of inorganic pigments is well known in the art.

U.S. Pat. No. 4,233,081, discloses a dispersing agent derived from the reaction of an alpha-hydroxy acrylic acid and inorganic bases such as hydroxides of alkali metals, ammonium hydroxide or organic nitrogen bases of the aliphatic type such as diethanolamine.

Japanese Pat. No. 63035899, discloses as dispersants the polymerization products of acrylic acid and methacrylate modified ethylene oxide/propylene oxide block copolymers which are subsequently neutralized yielding the corresponding salts.

Japanese Patent No. 620830028 discloses dispersants consisting of copolymers having repeating units including olefins, maleic anhydride, and poly(oxyalkylene) ester salts.

European Patent No. 296,610, discloses a glycol dispersion of calcium carbonate wherein the calcium carbonate is initially treated with polymers of alpha, beta-unsaturated carboxylic acids, esters of such acids, or salts, examples of which include, a 50:50 acrylic acid-polyethylene glycol monomethylacrylate copolymer. The treated calcium carbonate is then wet-ground in an equivalent weight of glycol to give a dispersion.

Japanese Patent No. 60001268, discloses a dispersant composition consisting of a condensed phosphoric acid salt and polyacrylic acid salt, and/or polyoxyethylene alkyl ether.

The dispersants employed in the present invention are mixtures or blends of water soluble polycarboxylates and nonionic polyether polyols.

SUMMARY OF THE INVENTION

In accordance with the instant invention, it has been discovered that polycarboxylate/nonionic polyether polymer blends provide performance characteristics in regard to pigment slurry dispersions which are at least the equal of the anionic polymer itself. This fact is surprising in that polyoxyethylene homopolymers and the polyoxyethylene/polyoxypropylene block copolymers have no dispersing properties for hydrophilic pigments on their own. In fact, rather than reducing slurry viscosities these nonionic polymers can cause slurry thickening.

DETAILED DESCRIPTION OF THE INVENTION

In accordance with the instant invention it has been found that blends of polycarboxylates and nonionic polyether polymers provide a dispersant composition and means for dispersing inorganic pigments such as kaolin clay, calcium carbonate, titanium dioxide, satin white, aluminum hydroxide, slaked lime, magnesium hydroxide, iron oxide red, cement, alumina, zirconia, silica, silicon carbide or silicon nitride. The method of this invention is particularly effective in producing an aqueous dispersion of calcium carbonate, kaolin clay, or titanium dioxide.

The present invention not only provides a novel dispersant capable of providing effective dispersant blends for aqueous inorganic pigments but the invention provides a simple efficient means of tailoring a dispersant blend to meet the requirements of a particular pigment slurry. The blend of polycarboxylate and nonionic polymer provides an effective dispersant for various inorganic pigments in ratios of from 90:10 to 50:50, (anionic:nonionic) at levels less than 0.6% dispersant (wt. disp. solids/wt. pigment), with actual ratios and percent dispersant dependent on the type of pigment and components used in the anionic/nonionic blend.

The polycarboxylates used in the present invention have a molecular weight range of from 1,200 to about 250,000, with a preferred range of from 2,000 to 12,000. When reference is made to polycarboxylates within the context of the present invention it is understood to encompass those water-soluble homo- and copolymers having at least one monomeric unit containing $C_{3-6}$ monoethylenically unsaturated mono or dicarboxylic acids or their salts. Suitable monocarboxylic acids of this type are for example, acrylic acid, methacrylic acid, ethacrylic acid, vinylacetic acid, allylacetic acid, and crotonic acid. The preferable monocarboxylic acids from this group are acrylic and methacrylic acid. A further component of the polycarboxylate comprises monoethylenically unsaturated $C_{4-6}$ dicarboxylic acids, for example maleic acid, itaconic acid, citraconic acid, mesaconic acid, fumaric acid, or methylenemalonic acid. The preferred acid is maleic acid.

Figure 1:
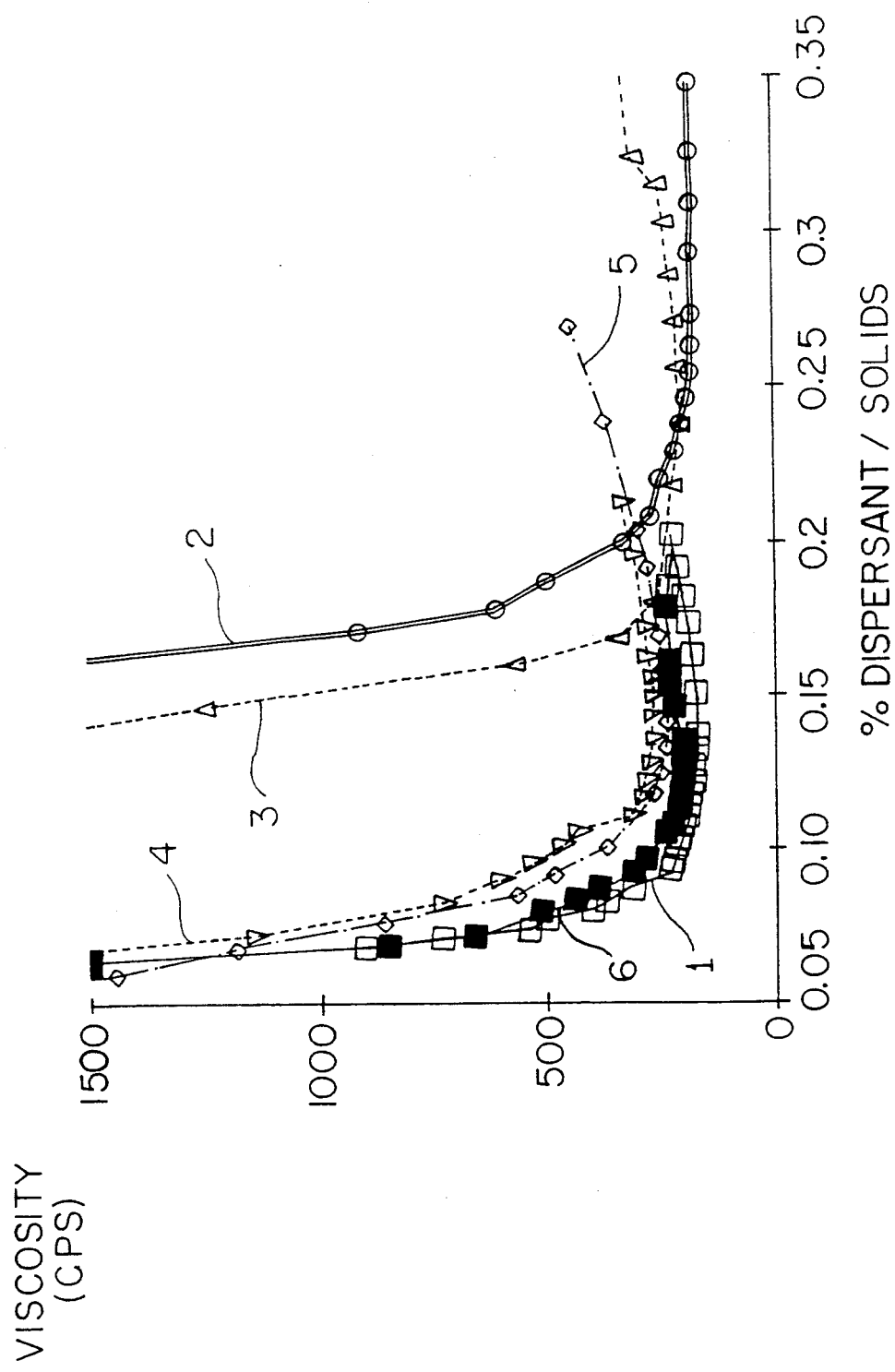

Other organic substituents may be used as comonomers or as modifiers added along the polymer chain. Examples of such are shown in FIG. 1.

where $R = H$ or a secondary alcohol such as isopropanol, $X = COOH$, $COO^-Na^+$, methylvinylether, isobutylene, vinyl acetate, acrylamide, or styrene, with the proviso that when $R = $ a secondary alcohol $X = COOH$ or $COO^-Na^+$ and when $X = $ any other above referenced group, $R = H$. The preferred polycarboxylates are the sodium salt of polyacrylic acid, said polymer having a molecular weight of 8000, and a sodium salt of polyacrylic acid modified with a secondary alcohol such as isopropanol, said polymer having a molecular weight of 4000.

The polycarboxylates used in the instant invention are obtained by methods well known to those skilled in the art. The general method of synthesis is via free radical polymerization. The polymerization may be carried out in an aqueous medium, in the presence of polymerization initiators, with or without regulants. The polymerization can take various forms; for example, the monomer(s) can be polymerized batchwise in the form of aqueous solutions. It is also possible to introduce into the polymerization reactor a portion of the monomer(s) and a portion of the initiator, to heat the mixture in an inert atmosphere to the polymerization temperature and then to add the remaining monomer(s) and initiator to the reactor at the rate of polymerization. Polymerization temperatures range from 20° to 200° C. Above 100° C. pressure vessels are employed.

The carboxyl containing monomers can be polymerized in the free carboxylic acid form, in the partial neutralized form, or completely neutralized. The neutralization is preferably effected with alkali metal and ammonium bases.

The polymerization initiators used are preferably water soluble free radical formers such as hydrogen peroxide, peroxodisulfates and mixtures of the two. The polymerization may also be started with water insoluble initiators such as dibenzoyl peroxide, dilaurylperoxide, or azodiisobutyronitrile. The polymerization may be carried out in the presence of regulants. Examples of such regulants include water soluble mercaptans, ammonium formate, and hydroxylammonium sulfate.

Examples of the polycarboxylates which may be used in the present invention are those marketed by BASF under the trademark SOKALAN ® polycarboxylates which are available in aqueous polymer solutions.

The hydroxy terminated polyoxyethylene homopolymers and hydroxy terminated polyoxyethylene/polyoxypropylene block copolymers used in the present invention have molecular weight ranges for the homopolymer from about 200 to about 20,000, with a preferred molecular weight of about 8,000 for the polyoxyethylene homopolymer and from about 950 to about 12000 for the block copolymer, with a preferred molecular weight of from 1500 to 8000.

The methods of preparation of the above-mentioned homo and copolymers are well known to those skilled in the art, and largely analogous in manner. Therefore, a single description for the manner of making the block copolymers will be described with the understanding that said description applies also to the polyoxyethylene homopolymer.

The polyoxyalkylene block copolymers employed in the present invention are cogeneric mixtures of conjugated polyoxyalkylene compounds containing in their structure oxypropylene groups, oxyethylene groups and the residue of an active hydrogen containing compound. The term "cogeneric mixture" used herein is a term that has been coined to designate a series of closely related homologues that are obtained by condensing a plurality of alkylene oxide units with a reactive hydrogen compound (see U.S. Pat. No. 2,549,438, particularly the sections beginning at column 12, line 40). This expression is well known to those skilled in the art as can be seen from U.S. Pat. Nos. 2,677,700; 2,674,619; and 2,979,528.

The active hydrogen containing compound also referred to herein as an initiator preferably has about 2 to 4 carbon atoms, and about 2 to 4 active hydrogen atoms. Such initiators include ethylene glycol, propylene glycol, butylene glycol, and ethylenediamine.

In one embodiment of this invention, the oxyalkylene compounds are those of the type disclosed in U.S. Pat. Nos. 2,674,619; 2,979,528; and 2,677,700 prepared by first oxypropylating an active hydrogen containing initiator compound, preferably propylene glycol or ethylenediamine and subsequently oxyethylating the resulting compound as more completely described in said patents, incorporated herein by reference. In such compounds the polyoxypropylene groups are present in polyoxypropylene chains that are attached to the initiator nucleus at the site of the reactive hydrogen atoms thereby constituting a polyoxypropylene polymer. The oxyethylene groups are attached to the polyoxypropylene polymer in oxyethylene chains.

These polyoxyalkylene compounds are believed to correspond to the formula:

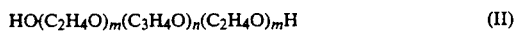

$$HO(C_2H_4O)_m(C_3H_4O)_n(C_2H_4O)_mH \qquad (II)$$

Wherein n has a value such that the molecular weight of the polyoxypropylene hydrophobic base is about 900 to 4000 and m has a value such that the oxyethylene content of the molecule is from about 10 to 80 weight percent.

It is further to be noted that when molecular weight is stated in this specification and claims in reference to the nonionic polyethers, unless otherwise explicitly stated, there is meant the average theoretical molecular weight which equals the total of the grams of the alkylene oxide employed per mole of reactive hydrogen compound. It is well recognized in the field of alkylene oxide chemistry that the polyoxyalkylene compositions one obtains by condensing an alkylene oxide with a reactive hydrogen compound are actually mixtures of compounds rather than a single molecular compound. The mixtures contain closely related homologues wherein the statistical average number of oxyalkylene groups equals the number of moles of the alkylene oxide employed and the individual members in the mixtures contain varying numbers of oxyalkylene groups.

The polyoxyalkylene compositions may also be compounds as described in U.S. Pat. No. 2,979,528, incorporated herein by reference. These compositions are prepared in much the same way as the polyoxyalkylene compounds described above. However, instead of ethylene glycol or propylene glycol as an initiator, a reactive hydrogen compound containing nitrogen is utilized. Ethylenediamine is the preferred nitrogen-containing reactive hydrogen compound.

Useful nitrogen-containing nonionic surfactants are mixtures of conjugated polyoxyethylene polyoxypropylene compounds based on a nitrogen-containing reactive hydrogen compound wherein chains of oxypropylene groups having a defined molecular weight are attached to the nucleus of the reactive hydrogen compound at the sites of the hydrogen atoms and wherein the chains of oxyethylene groups are attached to opposite end of the oxypropylene chains. The compositions are prepared by condensing propylene oxide with a nitrogen-containing reactive hydrogen compound, preferably ethylenediamine and subsequently condensing ethylene oxide with the propylene oxide-reactive hydrogen compound. The collective molecular weight of the oxypropylene chains attached to the nitrogen containing reactive hydrogen compound must be at least about 500 and can range up to about 2500 or higher The weight percent oxyethylene groups is about 30 to 80. These compounds are believed to have the following formula:

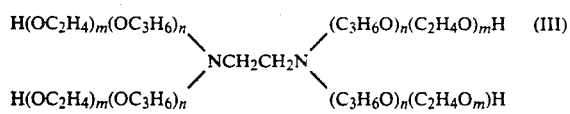
(III)

wherein n has a value such that the molecular weight of all the polyoxypropylene hydrophobic groups is about 500 to 7000 and m has a value such that the oxyethylene content of the molecule is from about 30 to 80 weight percent.

The invention is illustrated by the following specific examples, which are to be taken as illustrative and not in a limiting sense.

Polymer blends were tested for dispersant demand, a procedure used in the pigment slurry industry which measures a dispersant's efficiency and effectiveness. Efficiency is defined as the amount of dispersant needed to achieve the lowest possible slurry viscosity. Effectiveness is defined as the lowest slurry viscosity attainable using a given dispersant. Performance testing was done on the following inorganic pigments, kaolin clay, calcium carbonate and titanium dioxide.

Dispersant demands for kaolin clay were run using the following procedure:

1. 211 g of tap water was charged into a metal container suitable for use with a Hamilton-Beach blender.
2. 500 g of kaolin clay was added in a stepwise manner while adding small increments of dispersant in order to keep the slurry fluid (70% solids).
3. The initial viscosity was measured at the point where all the kaolin clay had been added and the slurry was fluid. Viscosity measurements are taken using a Brookfield viscometer with an LV spindle, set at 60 RPM, and a temperature of 23°-27° C.
4. After the initial viscosity has been determined, small amounts (0.03-0.1 g) of dispersant are added to the slurry and mixed for one minute at about 250 RPM with the Hamilton-Beach blender.
5. The slurry is allowed to sit for one minute; a viscosity measurement is then taken and the value recorded.
6. Steps 4 and 5 are repeated until a minimum viscosity is reached.

Dispersant demand for calcium carbonate was run using a procedure similar to that used for kaolin clay:

257 g of tap water was charged into a beaker.
2. 600 g of calcium carbonate was sifted into the beaker with stirring 5000 RPM (Cowles dispersator) and dispersant added as needed to maintain fluidity. (70% solids slurry)
3. The slurry was mixed at about 5000 RPM for 10 minutes.
4. After mixing the slurry viscosity was measured using the Brookfield viscometer with an RV spindle, at 20 RPM.
5. 1 or 2 drops of dispersant was then added to the slurry mixture and mixed by hand for one minute. The viscosity measurement was made after allowing the spindle to turn in the slurry for 1 minute.
6. Step 5 was repeated until a minimum viscosity was attained.
7. After the minimum viscosity was attained dispersant was added until a 20% excess of the dispersant demand was attained.

Dispersant demand for titanium dioxide was conducted using the same procedure as for calcium carbonate with the following changes:

The pigment was made to a 76.5% slurry—765 g $TiO_2$/235 g water.

The slurry was mixed at 5000 RPM's for 6 minutes prior to taking the first viscosity measurement.

Subsequent dispersant additions were mixed at 1500 RPM's for one minute.

Anionic polymer A defines the sodium salt of an acrylic acid homopolymer, having a molecular weight of 8000.

Anionic polymer B defines the sodium salt of a maleic acid-olefin copolymer having a molecular weight of 12,000.

Anionic polymer C defines the sodium salt of an acrylic acid homopolymer modified with isopropanol, having a molecular weight of 4,000.

Anionic polymer D defines an acrylic acid - maleic acid copolymer, having a molecular weight of 3,000.

Anionic polymer E defines the sodium salt of an acrylic acid homopolymer, having a molecular weight of 2,500.

Nonionic surfactant G defines a polyoxyethylene homopolymer having a molecular weight of 8000.

Nonionic surfactant H defines a polyoxyethylene-polyoxypropylene block copolymer, wherein the weight of the polyoxypropylene hydrophobe is 3250, the percent polyoxyethylene hydrophile is 50%, and the total molecular weight is 6500.

Nonionic surfactant I defines a polyoxyethylene-polyoxypropylene block copolymer, wherein the weight of the polyoxyethylene hydrophobe is 1750, the percent polyoxyethylene hydrophile is 80% and the total molecular weight is 8,400.

Nonionic surfactant J defines a polyoxyethylene-polyoxypropylene block copolymer, wherein the weight of the polyoxypropylene hydrophobe is 1750, the percent polyoxyethylene hydrophile is 50%, and the total molecular weight is 3400.

RESULTS

Table 1 summarizes all the dispersant demand data for the three pigments. The dispersant demand is given in percent (%) dispersant (weight dispersant solids/weight pigment × 100) along with the Brookfield minimum viscosity.

DETAILED DESCRIPTION OF THE DRAWINGS

FIG. 1 is a series of dispersant demand curves for a dispersion of kaolin clay in water (70% solids) at 25° C. The dispersants are as follows:

| Curve | Dispersant |
|---|---|
| 1 | Polymer C |
| 2 | 1:1 Polymer C/Surfactant G |
| 3 | 1:1 Polymer A/Surfactant G |
| 4 | 9:1 Polymer A/Surfactant G |
| 5 | 4:1 Polymer A/Surfactant G |
| 6 | Polymer A |

FIG. 1 shows the results of the dispersant demand screening with kaolin clay and polyacrylate/nonionic blends. Note that the 80/20 blend of polymer A and surfactant G requires less total polymer than polymer A alone. Surfactant G has no dispersing properties of its own The 90/10 lend gives similar results but contains a higher amount of the anionic moiety.

Figure 2:
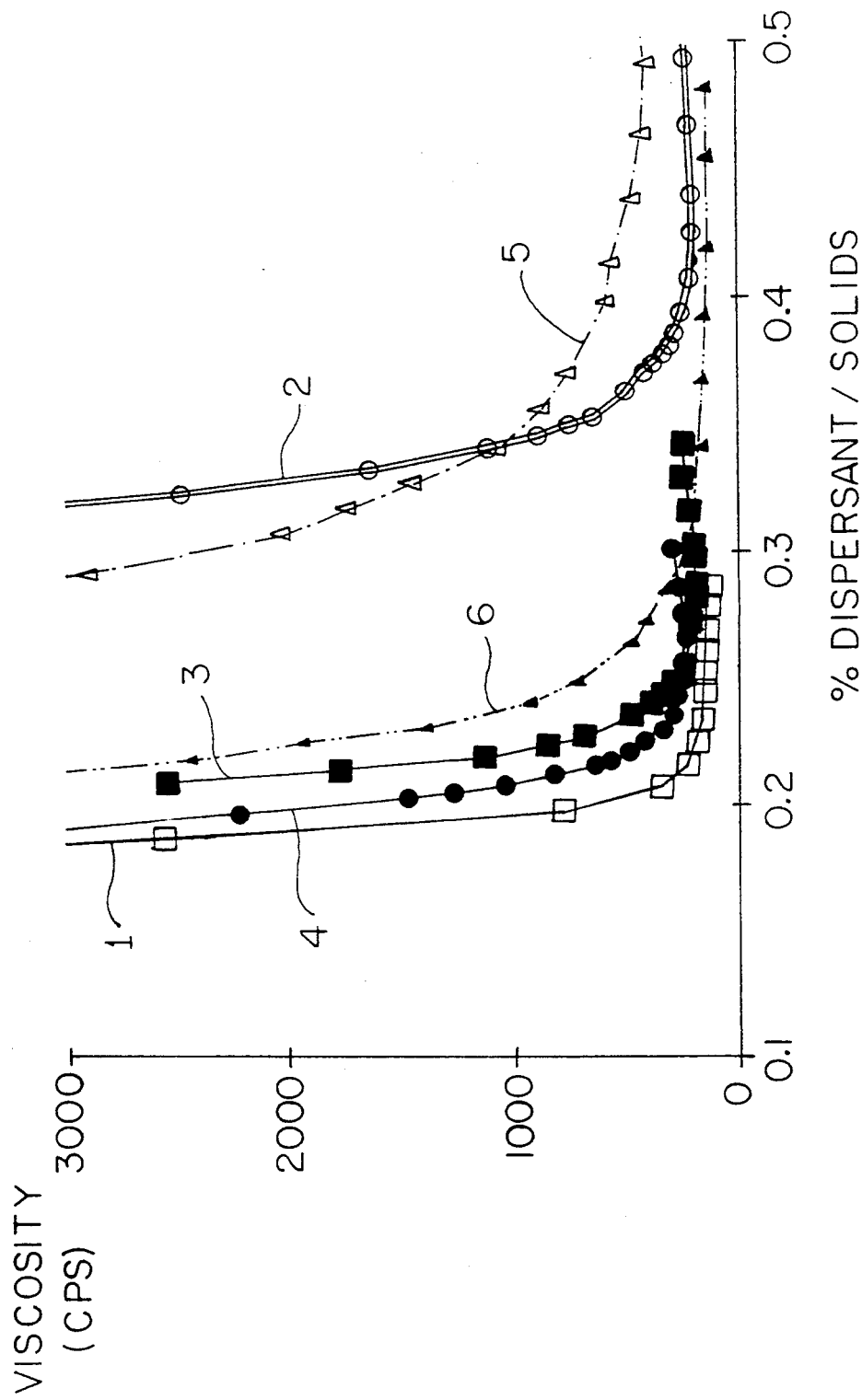

FIG. 2 is a series of dispersant demand curves for a dispersion of precipitated calcium carbonate in water (70% solids) at 25° C. The dispersants are as follows:

| Curve | Dispersant |
|---|---|
| 1 | Polymer A |
| 2 | 1:1 Polymer A/Surfactant G |
| 3 | 4:1 Polymer A/Surfactant G |
| 4 | 4:1 Polymer A/Surfactant H |
| 5 | Polymer E |
| 6 | 4:1 Polymer E/Surfactant H |

Figure 3:
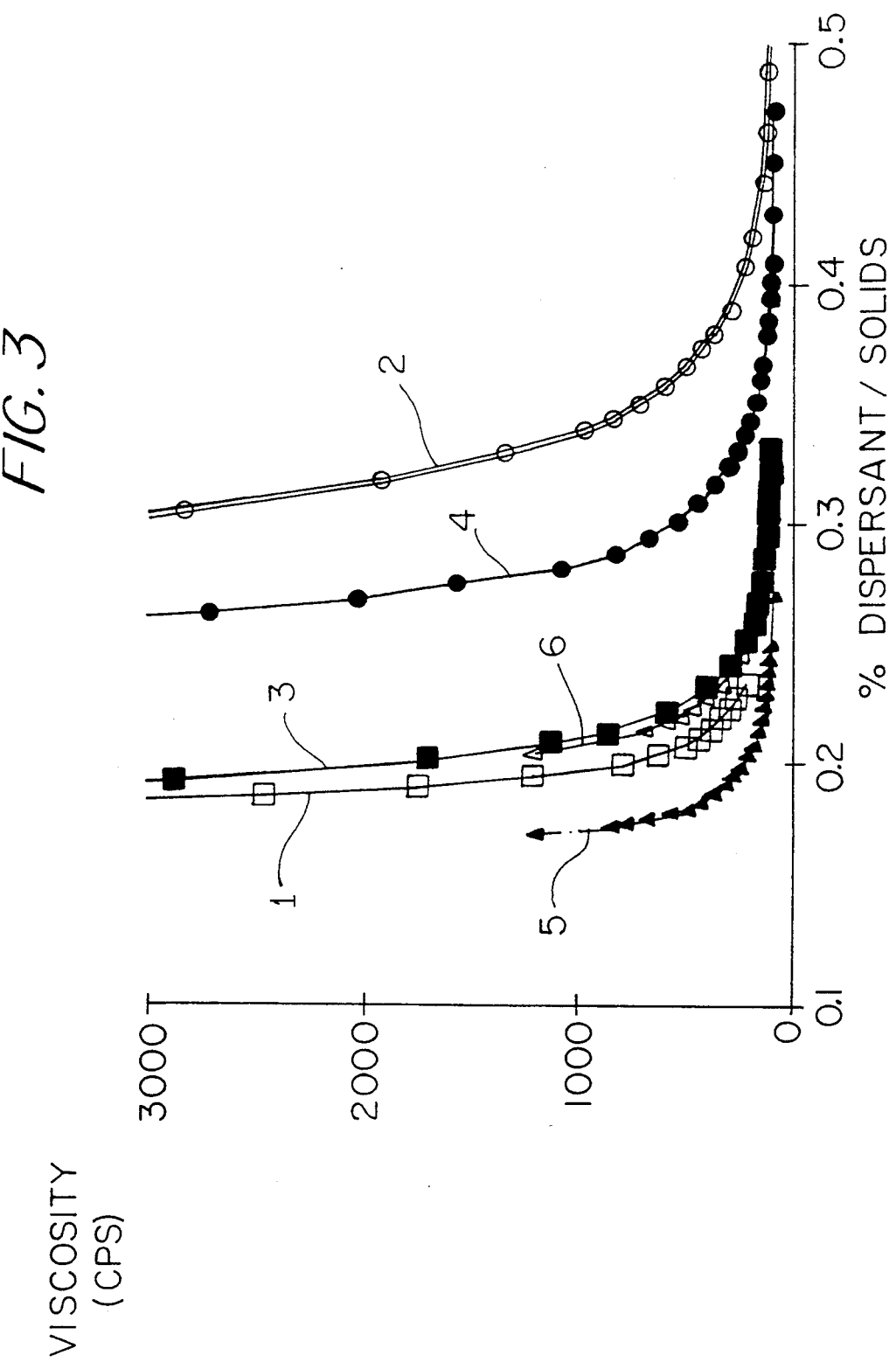

FIG. 3 is a series of dispersant demand curves for a dispersion of precipitated calcium carbonate in water (70% solids) at 25° C. The dispersants are as follows:

| Curve | Dispersant |
|---|---|
| 1 | Polymer C |
| 2 | 1:1 Polymer C/Surfactant I |
| 3 | 4:1 Polymer C/Surfactant I |
| 4 | 1:1 Polymer C/Surfactant H |
| 5 | 4:1 Polymer C/Surfactant H |
| 6 | 4:1 Polymer C/Surfactant G |

Figure 4:
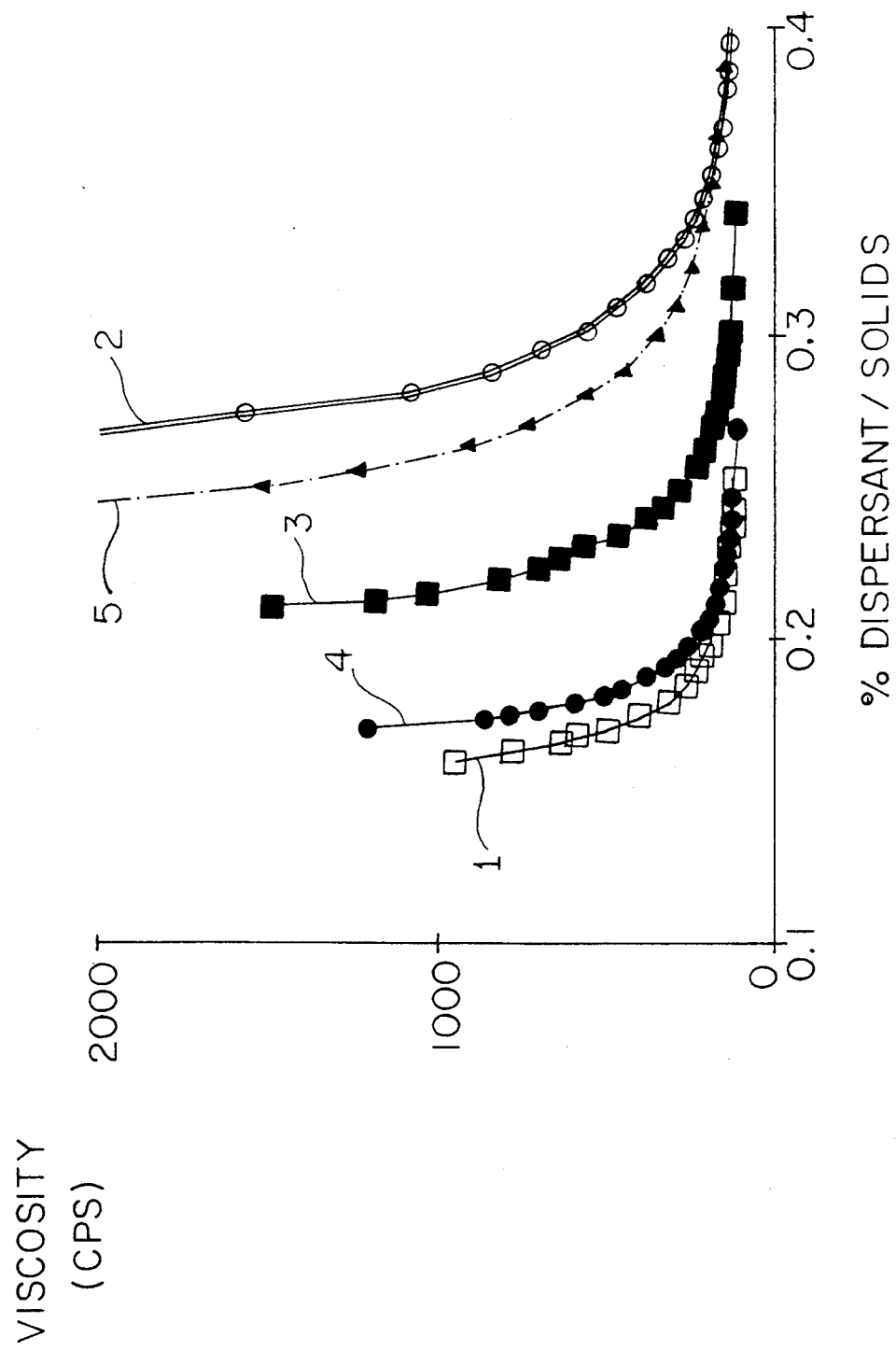

FIG. 4 is a series of dispersant demand curves for a dispersion of precipitated calcium carbonate in water (70% solids) at 25° C. The dispersants are as follows:

| Curve | Dispersant |
|---|---|
| 1 | Polymer C (NAOH) |
| 2 | 1:1 Polymer C/Surfactant H |
| 3 | 7:3 Polymer C/Surfactant H |
| 4 | 4:1 Polymer C/Surfactant H |
| 5 | Polymer C (NH4OH) |

FIG. 5 is a series of dispersant demand curves for a dispersion of precipitated calcium carbonate in water (70% solids) at 25° C. The dispersants are as follows:

| Curve | Dispersant |
|---|---|
| 1 | Polymer C |
| 2 | 4:1 Polymer C/Surfactant H |
| 3 | 4:3 Polymer C/Surfactant J |
| 4 | Polymer B |
| 5 | 4:1 Polymer B/Surfactant H |
| 6 | Polymer D |
| 7 | 4:1 Polymer D/Surfactant H |

FIGS. 2-5 show the results of the dispersant demand screening of various polycarboxylate/nonionic blends with calcium carbonate particles. Unlike the case of kaolin clay (see above), mixtures of polymer A and surfactant G (FIG. 2) did not decrease the total dispersant demand relative to polymer A alone, but did lower the total amount of polymer A used to achieve the same effectiveness. A much stronger effect is observed by blending 80% polymer E with 20% surfactant A. For this case, the blend is both more efficient and effective than the polycarboxylate, cutting the final viscosity in half while using 40% less total polymer.

If the ethylene oxide polymer is modified by incorporating a hydrophobe (propylene oxide, PO), the resulting block copolymer can be used to improve the efficiency and effectiveness of polymer C as a dispersant. FIG. 3 shows dispersant demand curves for polymer C and blends of that polymer with surfactant H and with surfactant I. From results compiled in Table 1, it is clear that a 4:1 blend of polymer C/surfactant H is both more efficient and effective than the polymer C by itself. Adding surfactant I to polymer C gives performance almost identical to a polymer C/surfactant G blend, which is comparable to that of polymer C itself. As seen previously, a 4:1 blend generally equals or betters the performance of the single polymer, while adding more (1:1 blend) increases the dispersant in this sytem. However, although the total dispersant in a system may increase at a 1:1 ratio, anionic/nonionic, the level of anionic polymer is reduced thus reducing the anionic loading on the pigment particle. This fact is evidenced in the results in Table 2 for 1:1 blends of polymer C/surfactant H and polymer A/surfactant G. In each of these cases although the total amount of dispersant was greater than the amount of the anionic polymer alone, the amount of anionic polymer in the blend was less.

This phenomenon is observed to occur across structure type as well. For all three cases shown—polymer C (modified polyacrylate), polymer B (maleic acid/olefin copolymer) and polymer D (maleic/acrylic copolymer)—adding 20% surfactant H to the anionic polymer improves the polymer's dispersing capability. Also, surfactant J, a lower molecular weight nonionic surfactant, gives a similar but less dramatic result.

FIG. 6 shows the results of similar testing on titanium dioxide. FIG. 6 is a series of dispersant demand curves for a dispersion of rutile titanium dioxide RCL-9 in water (76.5% solids) at 25° C. The dispersants are as follows:

| Curve | Dispersant |
|---|---|
| 1 | Polymer C |
| 2 | 4:1 Polymer C/Surfactant G |
| 3 | 7:3 Polymer C/Surfactant H |
| 4 | 4:1 Polymer C/Surfactant H |

Again the addition of 20% surfactant H to polymer C gives a blend equaling the performance of the anionic polymer alone. Adding 30% nonionic worsens dispersing capability. Surfactant G does not show the same enhancing effect as for clay and calcium carbonate.

With all particles tested (kaolin, $CaCO_3$, $TiO_2$) lower amounts of polycarboxylate can be used in conjunction with a nonionic polyether polymer to obtain equivalent viscosity. This property is very desirable in the paper industry where calcium carbonate and kaolin are used as coatings.

TABLE 1

| POLYMER BLEND | DD KAOLIN (%/VISC) | DD CACO3 (%/VISC) | DD TIO2 (%/VISC) |
|---|---|---|---|
| Polymer A | 0.15/230 | 0.24/180 | 0.30/76 |
| Polymer C | 0.118/178 | 0.24/220 | 0.425/163 |
| 1:1 polymer A/surfactant G | 0.237/202 | 0.426/216 | |
| 90:10 polymer A/surfactant G | 0.121/283 | | |
| 80:20 polymer A/surfactant G | 0.125/253 | 0.279/212 | |
| 1:1 polymer C/surfactant G | 0.254/184 | | |
| 4:1 polymer C/surfactant G | | 0.295/150 | 0.532/202 |
| 80:20 polymer A/surfactant H | | 0.26/252 | |
| 80:20 polymer E/surfactant H | | 0.368/174 | |
| 80:20 polymer C/surfactant H | | 0.228/150 | 0.437/177 |
| 70:30 polymer C/ | | 0.294/146 | 0.542/190 |

TABLE 1-continued

| POLYMER BLEND | DD KAOLIN (%/VISC) | DD CACO₃ (%/VISC) | DD TIO₂ (%/VISC) |
|---|---|---|---|
| surfactant H | | | |
| 50:50 polymer C/ surfactant H | | 0.43/116 | |
| 50:50 polymer C/surfactant I | | 0.49/146 | |
| 80:20 polymer C/surfactant I | | 0.296/146 | |
| 80:20 polymer C/surfactant J | | 0.254/152 | |
| Polymer B | 0.174/560 | 0.316/232 | |
| 80:20 polymer B/ surfactant H | | 0.297/190 | |
| 80:20 polymer D/ surfactant H | | 0.35/134 | |

UNABLE TO MAKE SLURRIES WITH SURFACTANTS I, H OR G ALONE.

TABLE 2

EFFECTIVE AMOUNTS OF POLYACRYLATE IN POLYACRYLATE/NONIONIC BLENDS AT DISPERSANT DEMAND LEVEL FOR CACO3

POLYMER C 0.24
POLYMER A 0.24
POLYMER E 0.492
POLYMER D 0.39
POLYMER B 0.316

| NONIONIC | POLYMER | POLYMER (%) | NONIONIC (%) | DISP DEMAND (TOTAL) | DISP DEMAND (POLYACRYLATE) |
|---|---|---|---|---|---|
| SURF. G | POLYMER C | 80 | 20 | 0.295 | 0.236 |
| SURF. H | | 80 | 20 | 0.26 | 0.208 |
| | | 70 | 30 | 0.294 | 0.206 |
| | | 50 | 50 | 0.43 | 0.215 |
| SURF. I | | 80 | 20 | 0.296 | 0.237 |
| | | 50 | 50 | 0.49 | 0.245 |
| SURF. J | | 80 | 20 | 0.254 | 0.203 |
| SURF. H | POLYMER B | 80 | 20 | 0.297 | 0.238 |
| | POLYMER D | 80 | 20 | 0.35 | 0.280 |
| SURF. G | POLYMER A | 80 | 20 | 0.279 | 0.223 |
| | | 50 | 50 | 0.426 | 0.213 |
| SURF. H | | 80 | 20 | 0.26 | 0.208 |
| | POLYMER E | 80 | 20 | 0.368 | 0.294 |

We claim:

1. A process for the preparation of an aqueous, high solids inorganic pigment slurry, which effectively lowers anionic loading on the pigment particle, which process comprises incorporating in said pigment slurry, a dispersant composition comprising:

A) a polycarboxylate having amolecular weight range from 1,200 to 250,000 selected from a group consisting of:
   i) homo and copolymers of monoethylenically unsaturated $C_{3-6}$ monocarboxylic acids and their salts;
   ii) homopolymers of monoethylenically unsaturated $C_{3-6}$ monocarboxylic acids and their salts wherein the polymer is modified with a secondary alcohol; and
   iii) copolymers containing a monomer unit consisting of a monoethylenically unsaturated $C_{4-6}$ dicarboxylic acid and its salt and at least one other monoethylenically unsaturated substituted monomer wherein the substituent groups are selected from alkyl vinyl ethers, olefins, and vinyl· esters and amides of carboxylic acids;
   iv) copolymers of monoethylenically unsaturated $C_{4-6}$ dicarboxylic acids and their slats, and B) a hydroxy terminated nonionic polyether polymer selected from a group consisting of hydroxy terminated polyoxyethylene homopolymers and hydroxy terminated polyoxyethylene/polyoxypropylene block copolymers;

wherein said polycarboxylate/nonionic polyether polymer dispersant is incorporated as a blend having a ratio of polycarboxylate to nonionic polyether polymer from about 9:1 to 1:1 based on parts by weight of the total dispersant providing a dispersed pigment composition with a viscosity essentially the same as a pigment composition dispersed solely with polycarboxylates and wherein said slurry contains about 70% by weight of solid inorganic pigment.

2. A process according to claim 1 wherein the dispersant blend consisting of the sodium salt of an acrylic acid homopolymer having a molecular weight of 8,000 and a hydroxy terminated polyoxyethylene homopolymer having a molecular weight of 8,000 in ratios of from 1:1 to 9;1 polycarboxylate/nonionic, is incorporated into an aqueous pigment slurry of kaolin clay having a solids content of about 70% thereby providing a dispersed pigment composition.

3. A process according to claim 1 wherein the dispersant blend consisting of the sodium salt of an isopropanol modified acrylic acid homopolymer having a molecular weight of 4,000 and a hydroxy terminated polyoxyethylene/polyoxypropylene block copolymer having a molecular weight range of from 3,400 to 8,400 in a 4:1 ratio polycarboxylate/nonionic, is incorporated into an aqueous pigment slurry of calcium carbonate having a solids content of about 70%, thereby providing a dispersed pigment composition.

4. A pigment composition comprising a dispersant composition and an aqueous slurry of inorganic pigments wherein said dispersant composition consists of a blend of a) a polycarboxylate having a molecular weight range from 1,200 to 250,000 selected from a group consisting of;
   i) homo and copolymers of monoethylenically unsaturated $C_{3-4}$ monocarboxylic acids and their salts;
   ii) homopolymers of monoethylenically unsaturated $C_{3-6}$ monocarboxylic acids and their salts wherein the polymer is modified with a secondary alcohol);
   iii) copolymers containing a monomer unit consisting of a monoethylenically unsaturated $C_{4-6}$ dicarboxylic acid and its salt and at least one other monoethylenically unsaturated substituted monomer wherein the substituent groups are selected from alkylvinylethers, olefins, and vinylesters and amides or carboxylic acids;

iv) copolymers of monoethylenically unsaturated $C_{4-6}$ dicarboxylic acids and their salts, and B) a hydroxy terminated nonionic polyether polymer selected from a group consisting of hydroxy terminated polyoxyethylene homopolymers and hydroxy terminated polyoxyethylene/polyoxypropylene block copolymers having molecular weights from about 950 to about 12,000, wherein the ratio of said polycarboxylate to said nonionic polyether polymer is from 9:1 to 1:1 based on parts by weight of the total dispersant, and wherein the amount of said dispersant composition is less than 0.6% by weight based on the weight of said solid inorganic pigments.

5. A pigment composition comprising a dispersant composition and an aqueous slurry of inorganic pigments wherein said dispersant composition consists of a blend of A) a polycarboxylate having amolecular weight range from 1,200 to 250,000 selected from a group consisting of;
  i) homo and copolymers of monoethylenically unsaturated $C_{3-6}$ monocarboxylic acids and their salts;
  ii) homopolymers of monoethylenically unsaturated $C_{3-6}$ monocarboxylic acids and their salts wherein the polymer is modified with a secondary alcohol;
  iii) copolymers containing a monomer unit consisting of a monoethylenically unsaturated $C_{4-6}$ dicarboxylic acid and its salts and at least one other monoethylenically unsaturated substituted monomer wherein the substituent groups are selected from alkylvinylethers, olefins, and vinylesters and amides of carboxylic acids;
  iv) copolymers of monoethylenically unsaturated $C_{4-6}$ dicarboxylic acids and their salts; and B) A hydroxy terminated nonionic polyether polymer selected from a group consisting of hydroxy terminated polyoxyethylene homopolymers and hydroxy terminated polyoxyethylene/polyoxypropylene block copolymers having molecular weights from about 950 to about 12,000, wherein the ratio of polycarboxylate to nonionic polyether polymer is from 9:1 to 1:1 based on parts by weight of the total dispersant, and wherein said slurry contains about 70% by weight of said solid inorganic pigments.

6. A pigment composition as claimed in claim 5, wherein the amount of said dispersant composition is less than 0.6% by weight based on the weight of said inorganic pigments.

7. A pigment composition as claimed in claim 5, wherein said polycarboxylate is selected from a group consisting of homopolymers of acrylic acid and its sodium salts, and homopolymers of acrylic acid modified with an aliphatic, secondary alcohol, and wherein the amounts of said dispersant composition is less than 0.6% by weight based on the weight of said inorganic pigments.

8. A pigment composition as claimed in claim 5, wherein said polycarboxylate is a 1:1 copolymer of maleic acid or its sodium salt and an olefin and wherein the amount of said dispersant composition is less than 0.6% by weight based on the weight of said inorganic pigments.

9. A pigment composition as claimed in claim 5, wherein the nonionic polyether polymer is a hydroxy terminated polyoxyethylene/polyoxypropylene block copolymer having a molecular weight from about 1,500 to about 8,400 and wherein the amount of said dispersant composition is less than 0.6% by weight based on the weight of said inorganic pigments.

10. A pigment composition as claimed in claim 6, wherein said dispersant composition consists of the homopolymer of the sodium salt of acrylic acid having a molecular weight of about 8,000 and a hydroxy terminated polyoxyethylene homopolymer having a molecular weight of about 8,000 in a ratio of from 9:1 to 1:1 polycarboxylate/nonionic based on parts by weight of total dispersant composition.

11. A pigment composition as claimed in claim 6, wherein said dispersant composition consists of the sodium salt of an isopropanol modified acrylic acid homopolymer having a molecular weight of about 4,000 and a hydroxy terminated polyoxyethylene/polyoxypropylene block copolymer having a molecular weight range of from 3,400 to 8,400, in a ratio of 4:1 polycarboxylate/nonionic based on parts by weight of total dispersant composition.

* * * * *